United States Patent [19]

Tachikawa

[11] Patent Number: 4,525,907

[45] Date of Patent: Jul. 2, 1985

[54] DEVICE FOR ASSEMBLING BLINDS

[75] Inventor: Takeyoshi Tachikawa, Yokohama, Japan

[73] Assignee: Tachikawa Blind Kogyo Kabushiki Kaisha, Tokyo, Japan

[21] Appl. No.: 518,903

[22] Filed: Aug. 1, 1983

[51] Int. Cl.³ .............................................. B23P 19/04

[52] U.S. Cl. ...................................................... 29/24.5

[58] Field of Search .......................................... 29/24.5

[56] References Cited

U.S. PATENT DOCUMENTS

| | | | |
|---|---|---|---|
| 2,827,686 | 3/1958 | Adelman | 29/24.5 |
| 3,292,232 | 12/1966 | Nilsson | 29/24.5 |
| 3,736,631 | 5/1973 | Edixhoven | 29/24.5 |
| 3,824,657 | 7/1974 | Nilsson | 29/24.5 |
| 4,073,044 | 2/1978 | Edixhoven | 29/24.5 |
| 4,188,693 | 2/1980 | Edixhoven | 29/24.5 |

*Primary Examiner*—Howard N. Goldberg
*Assistant Examiner*—S. Nichols
*Attorney, Agent, or Firm*—Jordan and Hamburg

[57] ABSTRACT

A device for assembling the blinds comprising a supporter to which a plurality of the bridges are provided, one pair of which comprising movable and stational ones for receivably sandwiching slat.

The device further has a plurality of triangle guide members, each having an arm projecting and another having a notch for receiving said arm to form a through elongated opening for passing the slat therethrough. The center line of the elongated opening of the guide and the pair of the bridges of the support coincides for the easiest insertion of the slat through the guide to the bridges, with the simple and quick manual operation or electrically operation, as the case may be.

17 Claims, 17 Drawing Figures

DEVICE FOR ASSEMBLING BLINDS

FIELD OF THE INVENTION

This invention relates to a device for assembling Venetian Blinds, and more particularly the assembling device which supports slats quickly and correctly to attach said slats to ladder cords in an easiest manner.

BACKGROUND OF THE PRIOR ART

In the conventional known Venetian blind production as shown in FIG. 1, a pair of ladder cords 3*a*, 3*b* are mounted between a head box 1 containing stopper means or mechanism for the slat ascending and descending cords (hereinafter referred to as slat up-down cords) and operating means for slat keeping and slanting ladder cords, and a bottom rail 2, in advance, said head box 1 is provisionally secured at a position where said bottom rail 2 does not contact a floor at site, and thereafter an workman lays down each slat on each suspension tape 5 of the ladder cords 3*a*, 3*b* at both sides in a ladder configuration, by his hands, and then he inserts and passes the slat up-down cords 6*a*, 6*b* through through holes 7*a*, 7*b* which are provided near the both ends of the slat 5 so as to attach tip end of the cords to the bottom rail 2, so that the blind is assembled.

However, the slats 5 is formed of a thin metallic sheet which is curved on which painting agent is coated and these are some times of 3–4 meters at each length. Hence, there have been provided numerous ladder cords to support such slats and each laying down of the slat on each of the suspension tape of the ladder cords by manual operation of the worker. Thus, it takes a considerable long time for such work and often two workmen should work in each pair for such job when the slats are relatively long. The recent higher cost and salary for the workers and such mode of the job with such assembling device will cause the higher cost and long assembling time which lead the incompetent products in the market.

SUMMARY OF THE INVENTION

To overcome those drawbacks in said prior art, the present invention has one of the objects to provide the device for assembling the Venetian blinds comprising a plurality of slats sandwiching means provided at a given distance on supporting means for receiving, sandwiching and holding slats therein and an arrangement for slidably translating ladder cords provided around the slat sandwiching means along a lengthwise direction of the slats of which one end is secured and received in said sandwiching means.

A second object of this invention is to provide the assembling device comprising a plurality of guide supports provided before the sandwiching means, so that one end of the slat is passed through said guide support and is receivably secured to said sandwiching means, and then said slat guide support is translated along a lengthwise direction of the slat to support the slat.

A third object of this invention is that the ladder cords is translated to a given position after it has been supported on the slat guide and then the lsat up-down cords are inserted and passed through the cord holes provided in the slats.

BRIEF DESCRIPTION OF THE ACCOMPANYING DRAWINGS

FIG. 8(*a*) is a view showing a grip;

FIG. 11(*b*) is a plan view of the device and the guide members showing those positional relationship;

DESCRIPTION OF THE PREFERRED EMBODIMENTS

Now, the preferred embodiments of this invention will be hereinafter discussed in detail with reference to the accompanying drawings.

Figure 2:
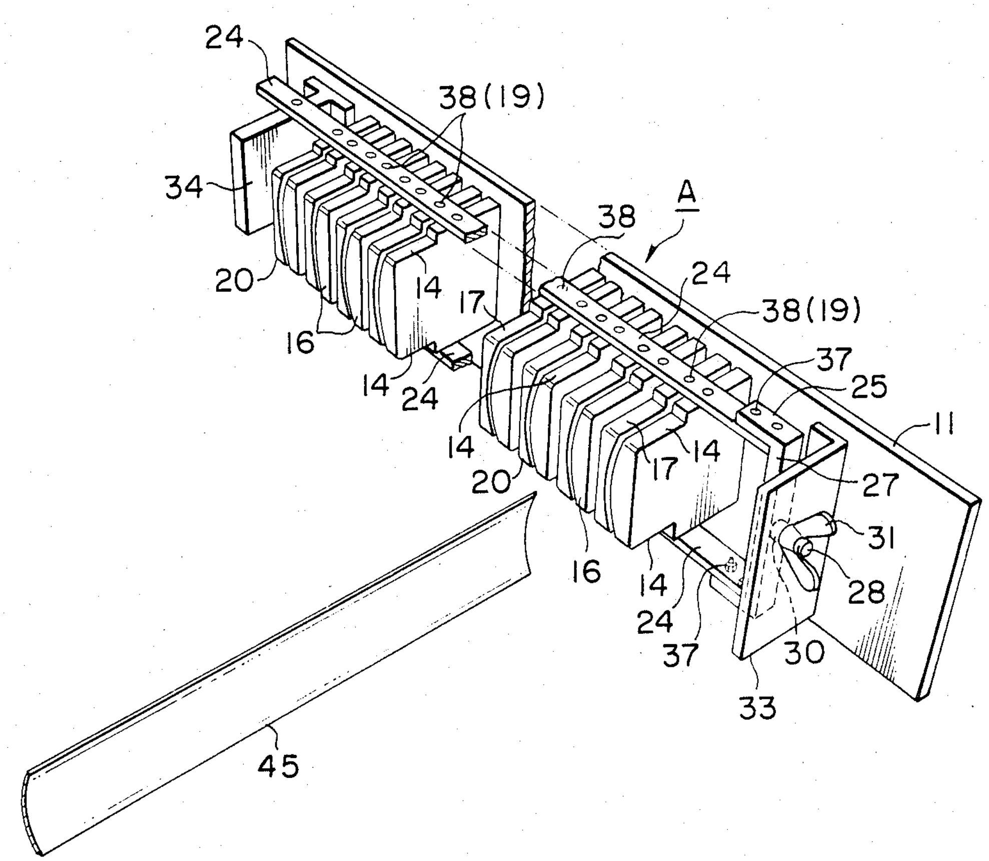
FIG. 2 is a perspective view of slat sandwiching means.
Figure 3:
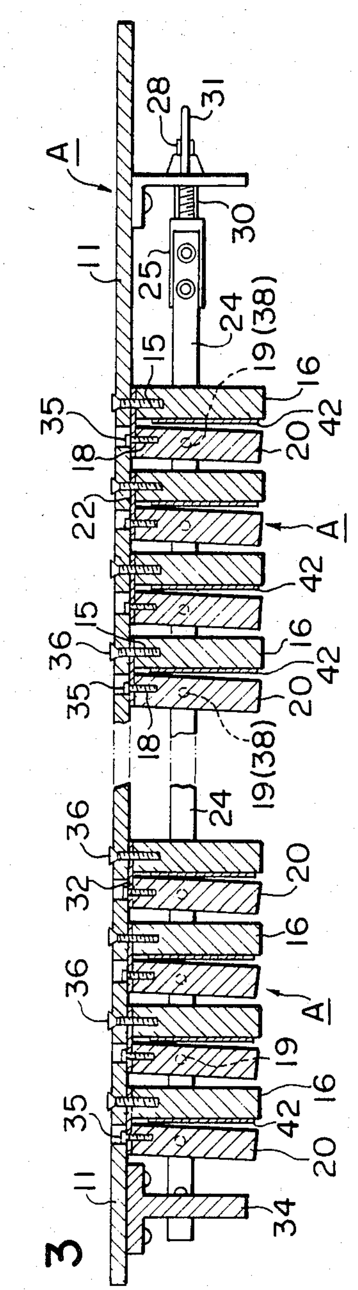
FIG. 3 is a cross sectional view of FIG. 2.
Figure 4:
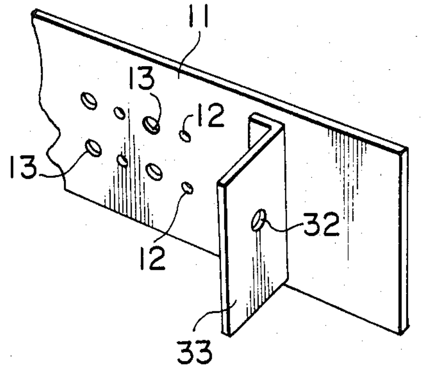
FIG. 4 is a perspective view of one embodiment of a supporting plate among the constitutional elements of the means of FIGS. 2–3.

Its first embodiment of this invention is illustrated in FIGS. 2–4, wherein the device for assembling the Venetian blind comprises: a supporter member 11 having a width wider than the slat and having a plurality of those alternately larger and smaller sizes 12,13 at a given distance; receiver supporter bridges 16 which are stational having rectangular shape although not limited thereto having reduced bellow portion with notches 14 and each screw bores 15 at its rearward side portion to attach it to said supporter plate 11 and further having a curved outward surface same as the curved surface formed on the slat; movable slat receiving and sandwiching bridges 20 having screw bores 18 at its upper and lower side portions with a slightly narrower side at one side from a generally centrol portion to attach a link arm which will be discussed later and screw bores 19 at its rear end to attach to a resilient plate which will be discussed later, respectively; the resilient member 22; link arms in double 24 having through bores 23 at each distance of attaching each bridge; the link 29 attached with a screwed rod 28 provided on an outer side of a vertical member 27 and with a horizontal member 26 provided with through bore 26, said link being in a generally U-shaped configuration; a butterfly screw 31 which mates and meshes a spring 30 mounted on said screw member 28; a terminal side wall plate 33 which is attached to one end of said supporter plate 11 and has a through bore 32 for receivably passing said screw rod 28 therethrough; and another terminal side wall plate 34 mounted on another end of said supporter plate 11.

Figure 5:
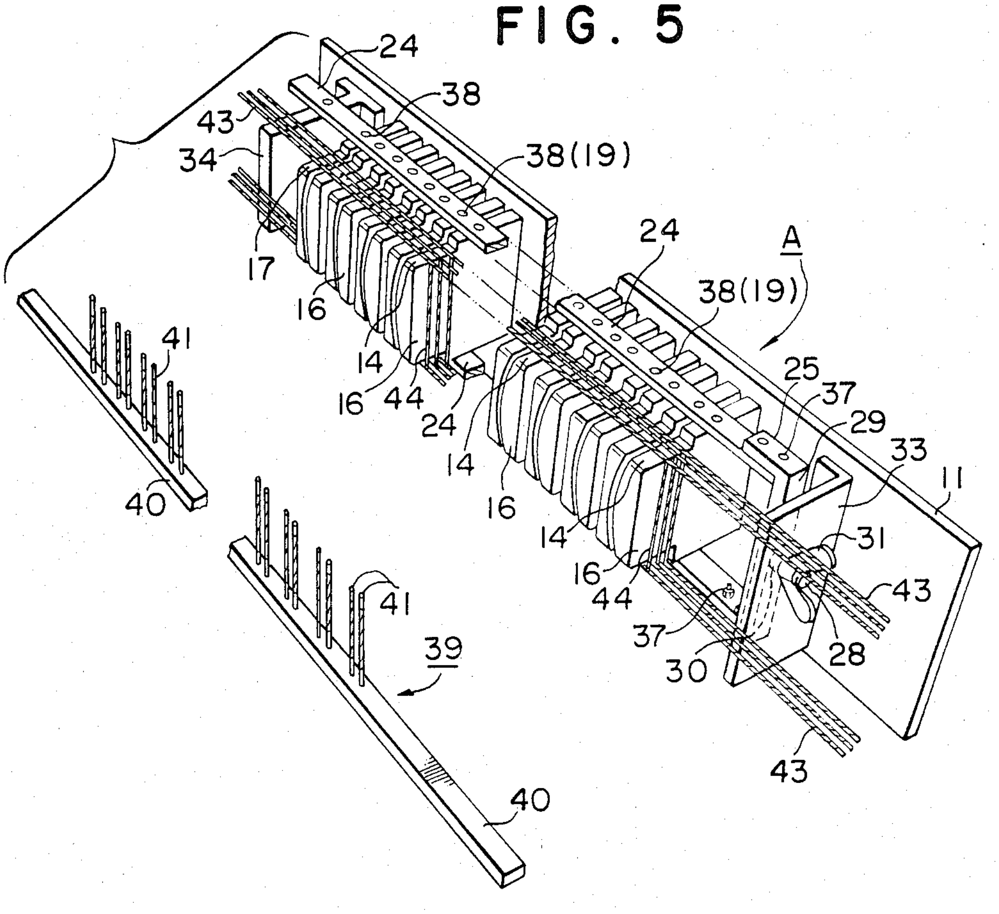

The slat sandwiching bridge mechanism A comprises, as shown in FIG. 5, a plurality of the movable bridges 20 at which end rim the resilient member 22 is secured with screws 35, a plurality of stational or fixed slat sandwiching bridges 16, each of which being secured to the supporter 11 through or via said resilient member 22 between the bridge and the supporter 11, with screws 36, two link rods 24 which are securely fixed to the horizontal member 25 of the interconnector 29, with screws 37, said link rods 24 being set along upper and lower sides of the stational and movable bridges 16,20 and the terminal end wall plate 34, so that the spring 30 is mated around the screw rod 28 and the butterfly screw 31 is threadably mounted through the through bore 32, and the links 24 are thredably mounted to the each movable bridges 16 with the threads 36.

A plurality of comb-like members 39 are formed such that a one surface 40 of a plate member 40 in a generally same length as the supporter 11, is provided with a plurality of pins 41 at the distance of the slat widthwise distance and the bridge distance in spaced position.

Now, assembling method and operation of the ladder cords to the slats by an aid of said device as discussed above will be discussed.

Two or more of ladder cords 43 corresponding to the length of the slat are hooked on the narrower portion of each bridge which has a generally same width of the slat, such that said supporting cords 44 take positions at the outside surface of the each stational bridge 16.

Thereafter, a rotation of the butterfly screw 31 in a counterclock direction as shown in FIGS. 2 and 3, will cause the each movable bridge 20 to rotate in a clockwise direction as it is mounted through the resilient member 22 on the supporter plate 11 so as to create an enough access or gap for receivably inserting the slat between the stational bridge 16 and the movable bridge.

Figure 6:
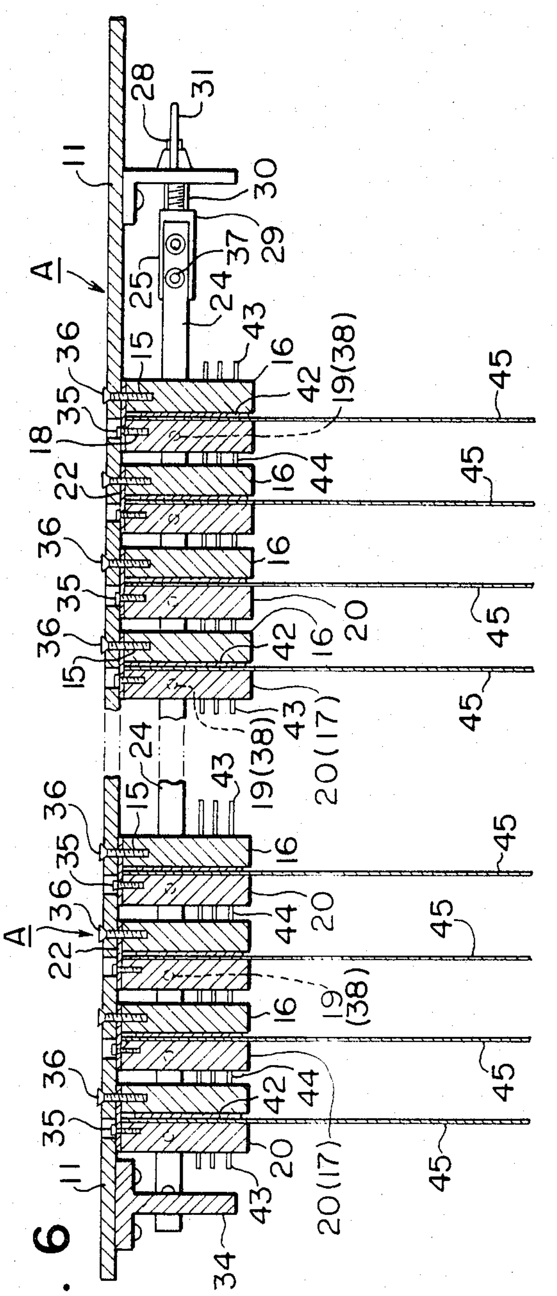
FIGS. 5–7 are operational work procedual views showing how to attach the ladder cords to the slats.

Furthermore, one end of the slat 45 is inserted between the each of the pair of the movable and stational bridges 20,16 and then on turning of the butterfly screw 31 in a clockwise direction, the each movable bridge 20 is attracted toward the right side by the link rods 24 connected to the interconnection member 27 is shown in FIG. 6, and then the slat end is sandwiched between the movable and stational bridges through a rubber plate 43 or the like materials of resilient characteristics which has been previously sticked along the curved surface of the stational bridge 16.

Figure 7:
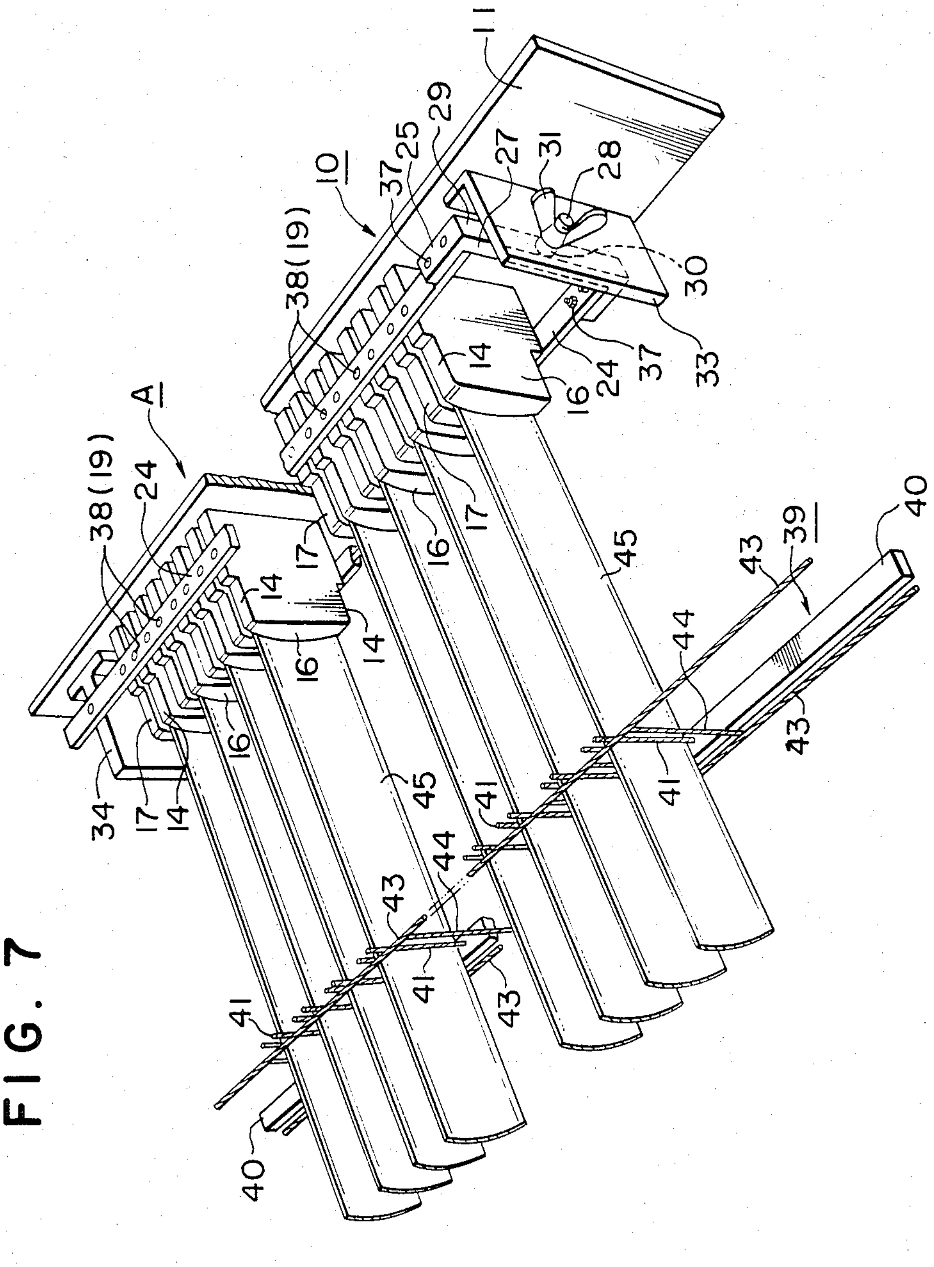
Figure 8A:
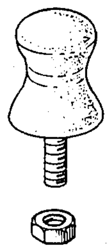
FIG. 8 is a perspective view showing a state that supporting guide members are placed on a base frame.
Figure 8:
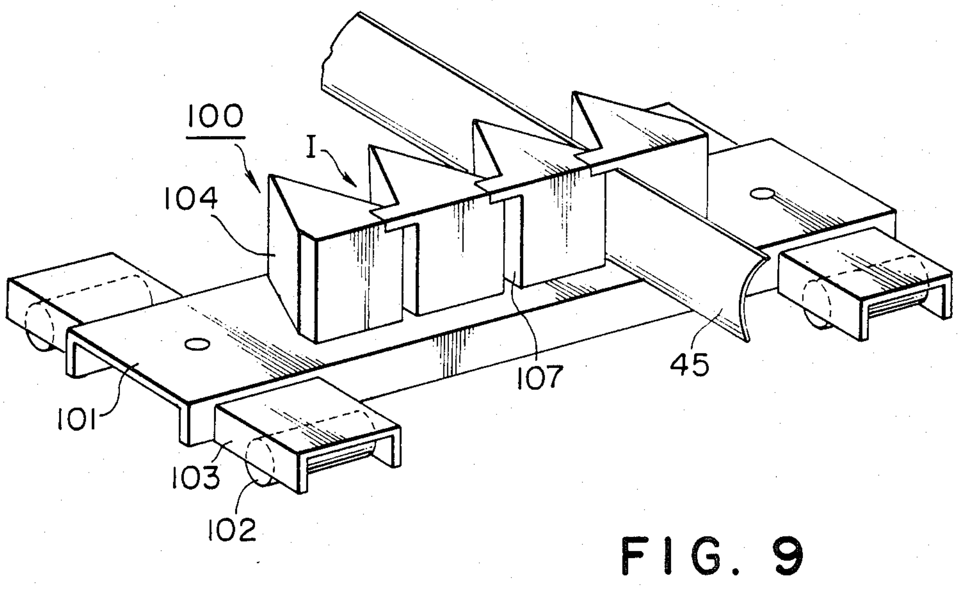
Figure 9:
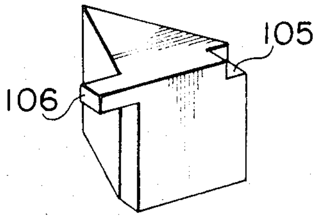
FIG. 9 is a perspective view is a perspective view showing each configuration of each guide member.
Figure 10:
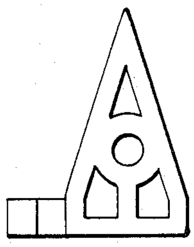
FIG. 10 is a bottom view of the member in FIG. 9, wherein numeral 107 shows that the member has threads.

Upon completion of the above state, the ladder cords 43 are transfered to the slat from the bridges, the comb-like members 39 lifted from the bottom to upward such that its one pair of pins 41 receive the slat therebetween, as shown in FIG. 7, and when the cords are further drawn frontwardly those are brought to a given position of the free end side of the slat 45 by the tip end of the pins 41 and the plate member 40 and the required number of the ladder cords to meet the slat's length are transfered on the slat from the bridges in the same manner.

Figure 1:
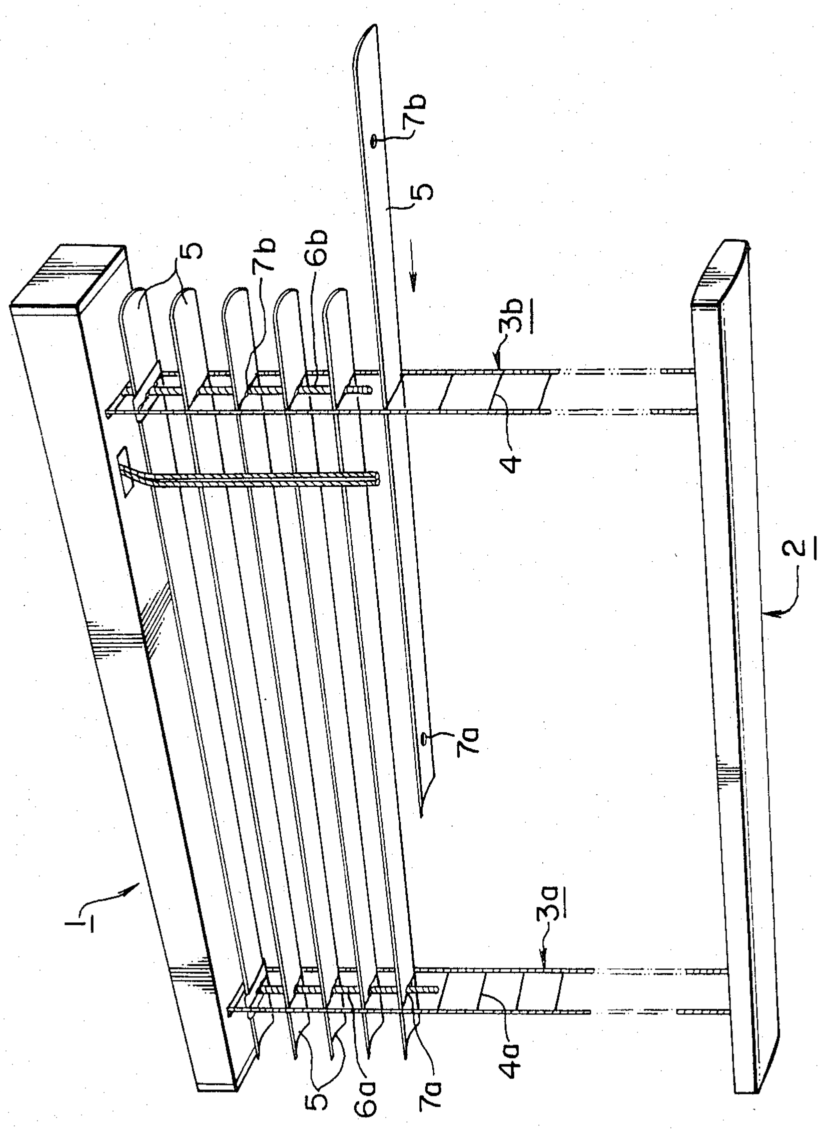
FIG. 1 is an explanatory view of the conventional assembling process of the known Venetian blinds.

Upon completetion of the transfer of the required number of the ladder cords the bottom rail (not shown) and the inner mechanism of the head box are attached to one end of the ladder cord 43 and the other end thereof, respectively, as shown in FIG. 1, and the up-down cords are passed through the bores provided at the both end wings of the slat and attached to the bottom rail, so that the finished and comple blind is realized.

Now the second embodiment will be hereinafter discussed.

A movable slat guides 100 is positioned in front of the bridges. The support is slidable and its base frame made of a light metallic material such as aluminum base frame 101 with its bent down short walls along the lengthwise lines and the walls have another frame 103 at a right angle having rollers 102 at its both side portions. The base frame has a plurality of triangular (in general) guide supports 104 thereon in combination. Each of the guides 104 has its one end corner a notch 105 and at another end an projection arm 106, respectively and said notch 105 mates another projection arm of another guide to provisionaly or temporaly integrate the both and hence all the guide members. Furthermore, the arm 106 is longer than the notch 105, so that the pair form a through elongated opening therebelow through which the slat slidably passes. As the slat is passed through from an arrow I it can be passed through the opening 107, after several abutting on the tapered wall in an easiest manner with no skil. To this end, an arrangement of the size or length of the bridge, its notch and arm is set same as the slat receiving or sandwiching gap of the bridges 20, 16 of the first embodiment will provide the easiest insertion of the slat into said receiving gap of the bridges.

The frames, 101, 103 and the rollers 102 may be made from any conventional known method.

The guide members 104 may be produced by extruding and injecting the plastic materials and any other like convenient method.

Handle, nuts and screws for secureing the frames may be also producted by any conventional convenient method.

A bottom surface of the guide member 104 is designed to have threads so as to be easily securely fitted to the frame 101 with screws and the like in the easiest manner.

Figures 11A, 11B:
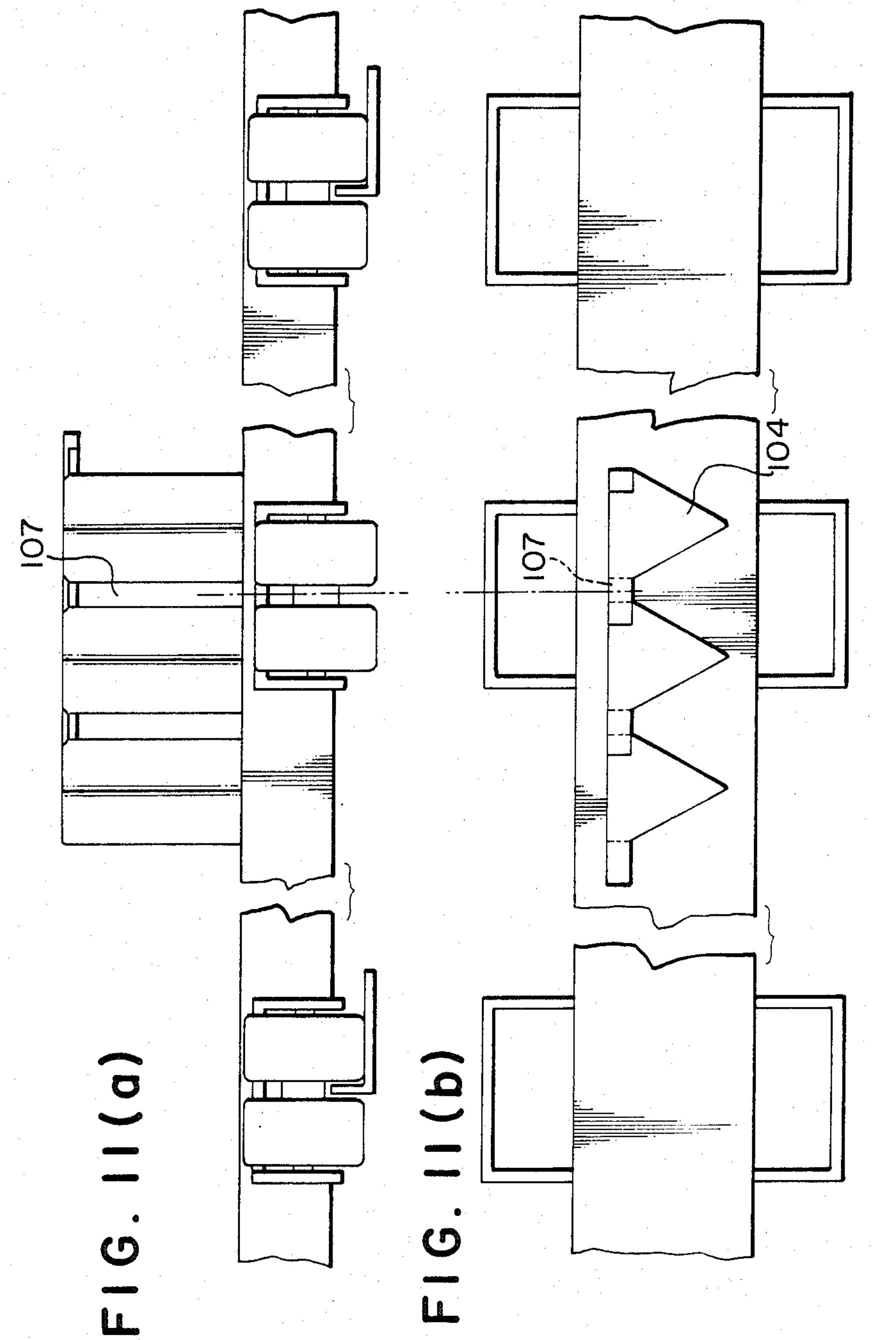
FIG. 11(*a*) is a frontal view of the guide members in combination, each of which has an arm and receiving depression for the former, to form a passing through a slit gap 107 for a slat.

FIG. 11 clearly proves that the center line of the through elongated opening of the each guide and the sandwiching bridges of the support correspond, as already discussed above.

Figure 12:
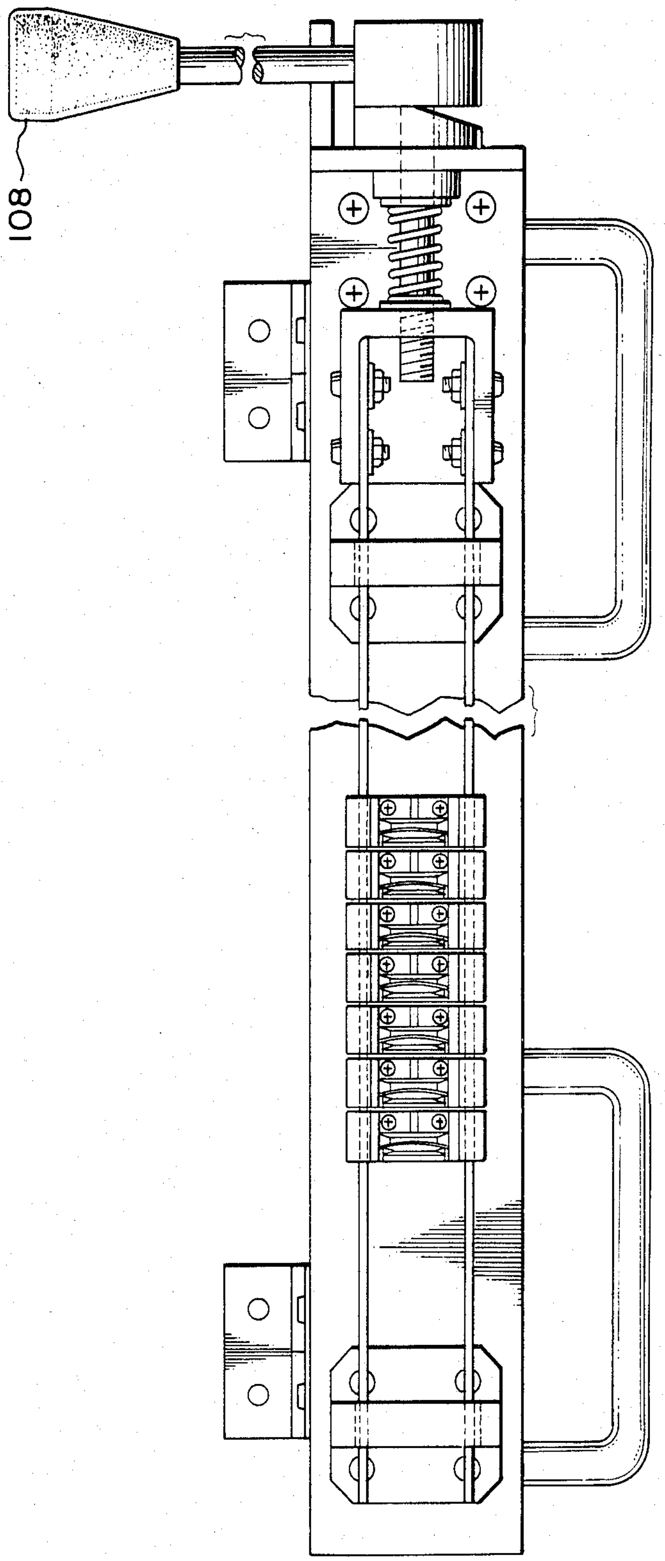
FIG. 12 is a plan view of the device of the supporters with a lever for operating the supporters, as a modification, showing the supporters are closed.

FIG. 12 shows the modification of the operation of the closure of the bridges by an operating lever 108 which will be manually or electrically made.

Figures 13, 14:
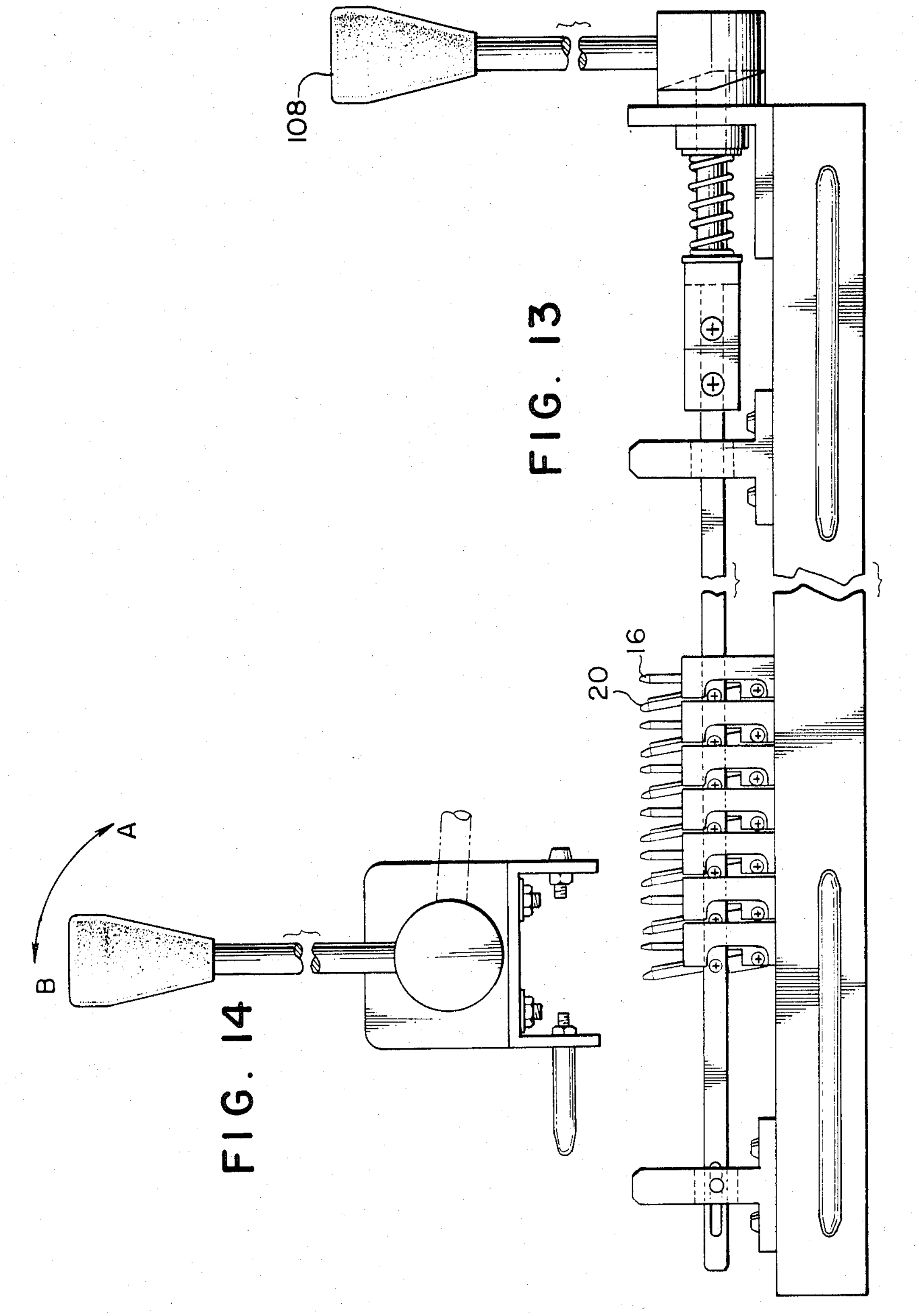
FIG. 13 is a frontal view of the device in FIG. 12 showing the supporters are in open state.
FIG. 14 is a view showing an closing or opening operation of the bridges by a lever.

FIG. 13 shows an opening of the bridges.

FIG. 14 shows the opening and closing of the bridges by the lever, wherein A at the arrow shows the closure while the B shows the opening.

In the second embodiment and its modification, the comb-like member 39 is deleted.

Figure 15:
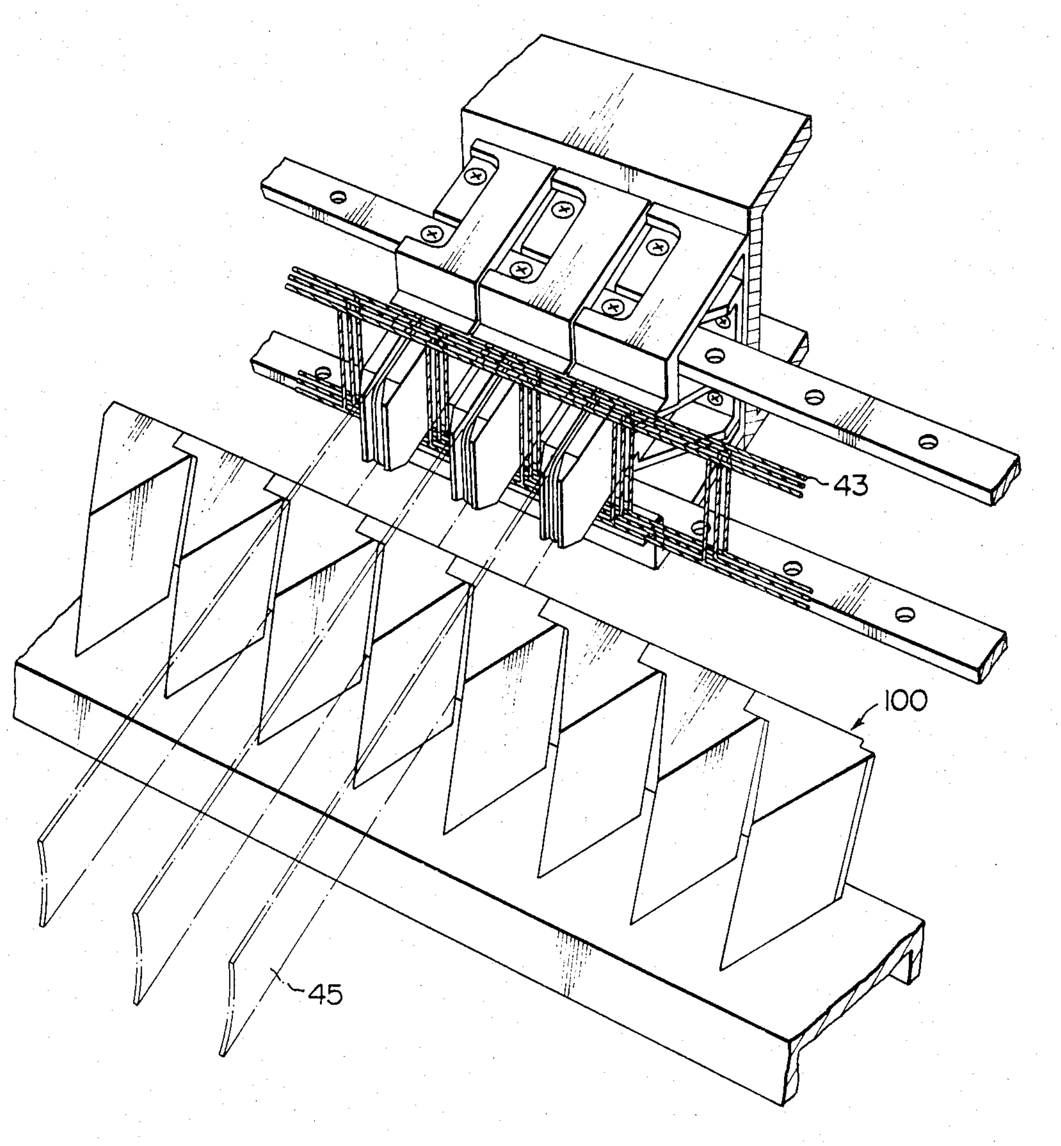
FIG. 15 is a perspective view showing how the ladder cords are hooked onto the sandwiching bridges.

In operation, the ladder cord is suspended on each pair of the bridges its its generally rectangular cord configuration when the both bridges are opened and then the slats are passed through the guide gaps of the guide members and then further pushed toward the bridges to be finally inserted therein. Then, the bridges are closed or locked to sandwich said slats therein. After that the support with the guide members thereon are drawn away from the bridges. Then, the ladder cord is also drawn following the support with said guide members (See FIG. 15). This operation is easier method for the unskilled workers than the first embodiment.

Upon and after several experiments by the unskilled workers, the slats are very easily slide into the guide slits or gaps of the guide members and reach at and into said bridges at a considerably high speed rate.

The device of this invention will realize that unskilled workers in any country can easily and quickly attach a plurality of ladder cords to long curvable slats and thus the manufacturing makers or manufacturers can provide competent blinds in the commercial markets, as the working productivity is remarkably raised and improved. Especially, the insertion of many slats through the guide members improves the productivity.

I claim:

1. Apparatus for assembling blinds of the type having slats arranged with ladder cords of the type having elongated cord parts joined to transverse cord parts, comprising an elongated support means, bridge means mounted on said support means for receiving end portions of a plurality of said slats and retaining said slats in spaced array, operable means for operating each of said bridge means between open and closed portions, said bridge means in said open position being operable to receive an end portion of a slat, said bridge means in said closed position being operable to clampingly retain the slat in a fixed position, said plurality of bridge means being positioned on said support means to provide a transverse space between each of said bridge means, said ladder cord being disposed about said bridge means such that said transverse cord parts are located in said transverse spaces between said bridge means as said elongated cord parts straddle said plurality of bridge means, said ladder cord being disposed about said bridge means before said slats are received by said bridge means such that after said slats are recieved and clampingly retained in said bridge means, said ladder cord is slid off of the bridge means onto the slats to a desired position along the longitudinal length of said slats.

2. Apparatus according to claim 1, wherein each of said bridge means comprises a first and a second bridge element, said first bridge element being fixedly mounted on said support means, said operable means mounting said second bridge element on said support means for movement between said open and closed position.

3. Apparatus according to claim 1, wherein said operable means comprises a resilient element having one part fixed to said second bridge element and another part fixed to said support means such that said resilient element thereby mounts said second bridge element on said support means for movement between said open and closed positions.

4. Apparatus according to claim 3, wherein said resilient element comprises a resilient strip member, first securing means securing one end portion of said resilient strip member to one end of said second bridge element, second securing means fixedly securing one end of said first bridge element to said support means, the other end portion of said resilient strip member being fixedly secured between said one end of said first bridge member and said support means.

5. Apparatus according to claim 2, wherein said operable means further comprises connecting means connected to said second bridge elements such that said connecting means is operable to simultaneously move all of said second bridge elements between said open and closed positions.

6. Apparatus according to claim 5, wherein said connecting means comprises at least one elongated member, each of said second bridge elements being pivotally connected to said elongated member.

7. Apparatus according to claim 6, wherein said connecting means comprises a biasing means biasing said elongated member in one direction.

8. Apparatus according to claim 6, wherein said connecting means comprises an adjustable means for adjustably changing the position of said elongated member.

9. Apparatus according to claim 1, wherein the slats have curved surfaces, said bridge means having arcuate surfaces corresponding to the curved surface of said slats.

10. Apparatus according to claim 9 further comprising resilient means mounted on one of said curved surfaces of said bridge means.

11. Apparatus according to claim 6, wherein each of said first and second bridge elements has an inner portion and an outer portion, said inner portion having a greater width than said outer portion, said elongated member being pivotally mounted to said inner portions of said second bridge elements, said ladder cord straddling said outer portions of said first and second bridge elements.

12. Apparatus according to claim 1 further comprising an elongated comb means having a plurality of pins extending transversely thereof, said pins being spaced such that the comb means is movable to a position to place said pins in the spaces between said bridge means such that movement of said comb means generally parallel to said slats will cause said pins to engage said ladder cord to thereby slide said ladder cord off of said bridge means onto said slats.

13. Apparatus according to claim 1 further comprising guide means disposed in front of said bridge means for guiding said slats into said bridge means.

14. Apparatus according to claim 13, wherein said guide means has a plurality of slots spaced from one another corresponding to the spacing between said plurality of bridge means, said guide means further comprising tapered entrace walls leading to said slots for guiding the slats into said slots.

15. Apparatus according to claim 14, wherein said guide means comprises a plurality of guide members each having a notch and an arm such that the notch of one guide member mates with the arm of another guide member to form an elongated guide means.

16. Apparatus according to claim 15, wherein said arms define a part of said slot.

17. Apparatus according to claim 14 further comprising mounting means for mounting said guide means for movement in a direction parallel to said slats as the latter are retained by said bridge means.

* * * * *